(12) United States Patent
Elizondo et al.

(10) Patent No.: US 7,364,199 B2
(45) Date of Patent: Apr. 29, 2008

(54) CONFIGURABLE VEHICLE RESTRAINT SYSTEM HAVING VARIABLE ANCHOR POINTS

(75) Inventors: Daniel Alejandro Romero Elizondo, Guadalupe (MX); Jose Luis Alcantar Ye, Escobedo (MX)

(73) Assignee: Takata Seat Belts, Inc., Auburn Hills, MI (US)

( * ) Notice: Subject to any disclaimer, the term of this patent is extended or adjusted under 35 U.S.C. 154(b) by 290 days.

(21) Appl. No.: 10/728,670

(22) Filed: Dec. 4, 2003

(65) Prior Publication Data

US 2005/0121897 A1 Jun. 9, 2005

(51) Int. Cl.
*B60R 22/04* (2006.01)
(52) U.S. Cl. .................... 280/801.1; 297/484; 280/808
(58) Field of Classification Search ............. 280/801.1, 280/808; 297/484, 483, 467
See application file for complete search history.

(56) References Cited

U.S. PATENT DOCUMENTS

| | | | |
|---|---|---|---|
| 1,898,090 A | 2/1933 | Lethern | |
| 2,576,867 A | 11/1951 | Wilson, Jr. | |
| 2,794,654 A | 6/1957 | Sullivan | |
| 3,052,432 A * | 9/1962 | Martin | 297/467 |
| 3,162,485 A | 12/1964 | Prangnell | |
| 3,306,662 A | 2/1967 | Finnigan | |
| 3,822,915 A | 7/1974 | Colucci | |
| 3,832,002 A | 8/1974 | Eggert, Jr. et al. | |
| 3,847,434 A | 11/1974 | Weman | |
| 4,488,691 A | 12/1984 | Lorch | |
| 5,123,673 A | 6/1992 | Tame | |
| 5,156,436 A | 10/1992 | Grene | |
| 5,215,354 A | 6/1993 | Grene | |
| 5,306,044 A * | 4/1994 | Tucker | 280/801.1 |
| 5,352,024 A | 10/1994 | Grene | |
| 5,411,319 A | 5/1995 | Kuiri | |
| 5,449,223 A * | 9/1995 | Miculici et al. | 297/484 |
| 5,472,260 A * | 12/1995 | Czapski et al. | 297/112 |
| 5,513,897 A | 5/1996 | Lemmen | |
| 5,908,223 A | 6/1999 | Miller | |
| 5,971,492 A * | 10/1999 | Pitman | 297/484 |
| 6,076,894 A | 6/2000 | Busch | |
| 6,089,662 A * | 7/2000 | Lambert et al. | 297/238 |
| 6,179,329 B1 | 1/2001 | Bradley | |
| 6,293,588 B1 * | 9/2001 | Clune | 280/808 |
| 6,309,024 B1 | 10/2001 | Busch | |
| 6,312,056 B1 * | 11/2001 | Murphy et al. | 297/464 |
| 6,338,529 B1 * | 1/2002 | David et al. | 297/250.1 |
| 6,367,882 B1 * | 4/2002 | Van Druff et al. | 297/484 |
| 6,375,270 B1 | 4/2002 | Sullivan et al. | |
| 6,520,392 B2 | 2/2003 | Thibodeau et al. | |
| 6,786,510 B2 * | 9/2004 | Roychoudhury et al. | 280/802 |
| 6,837,547 B2 * | 1/2005 | Delventhal et al. | 297/484 |
| 2001/0008337 A1 | 7/2001 | Ganesan | |
| 2002/0089163 A1 | 7/2002 | Bedewi et al. | |
| 2002/0089164 A1 | 7/2002 | Rouhanna et al. | |
| 2002/0178492 A1 | 12/2002 | Ashline | |

(Continued)

*Primary Examiner*—Paul N. Dickson
*Assistant Examiner*—George D. Spisich
(74) *Attorney, Agent, or Firm*—Fitch, Even, Tabin & Flannery

(57) ABSTRACT

A vehicle restraint system provides the seat occupant with options for three-point, four-point and five-point seat belt configurations. In one embodiment, the restraint system includes two three-point seat belt systems arranged as mirror images and a two position buckle located along the center line of the seat cushion.

34 Claims, 6 Drawing Sheets

U.S. PATENT DOCUMENTS

| | | | |
|---|---|---|---|
| 2003/0173817 A1* | 9/2003 | Vits et al. | 297/484 |
| 2004/0012242 A1* | 1/2004 | White | 297/484 |
| 2004/0051294 A1* | 3/2004 | Xu | 280/801.1 |
| 2005/0067827 A1* | 3/2005 | Bostrom et al. | 280/801.1 |

* cited by examiner

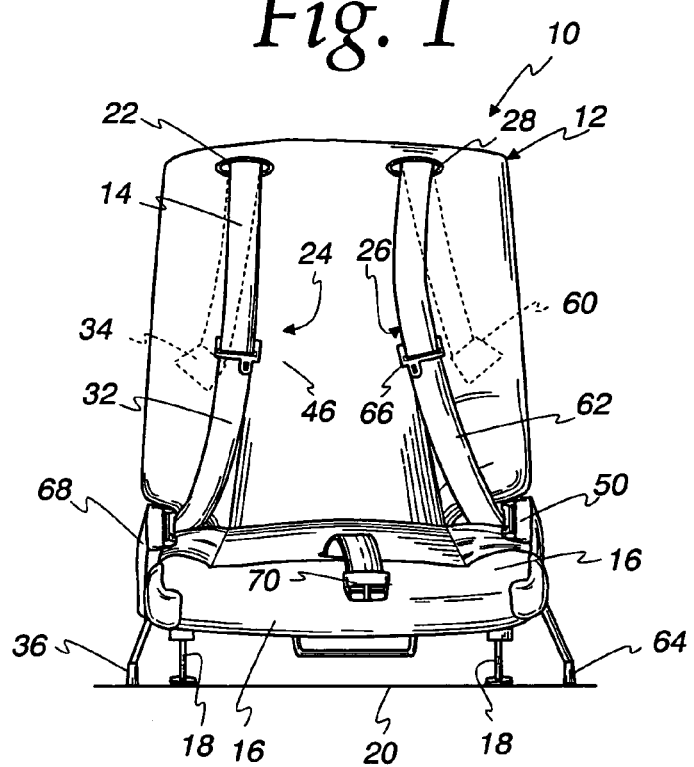
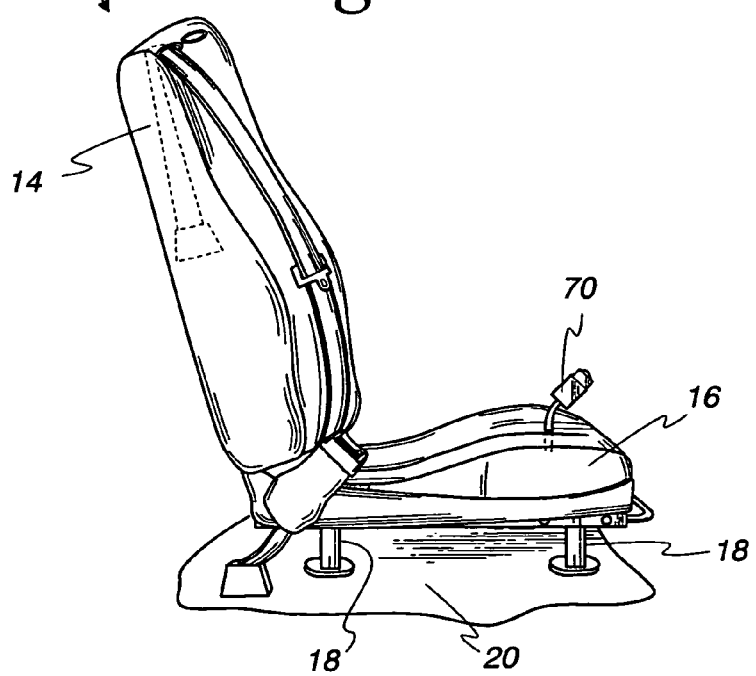

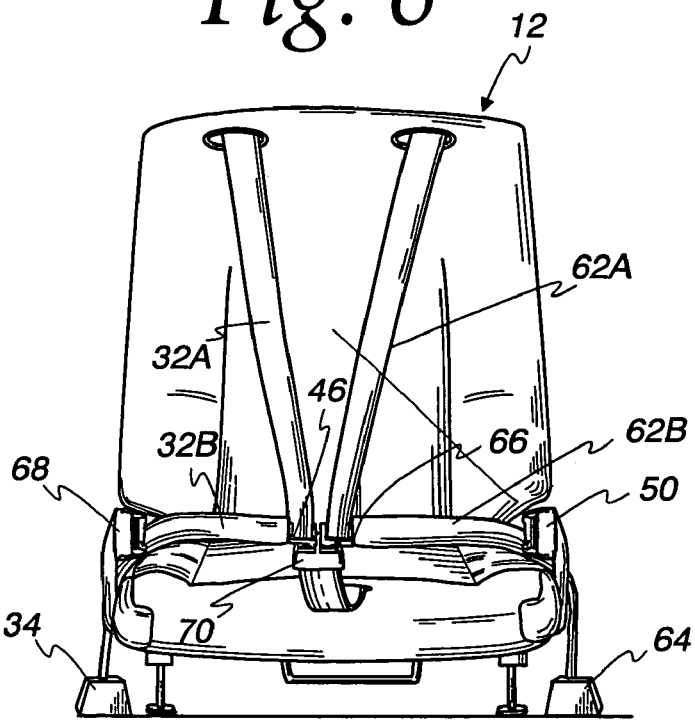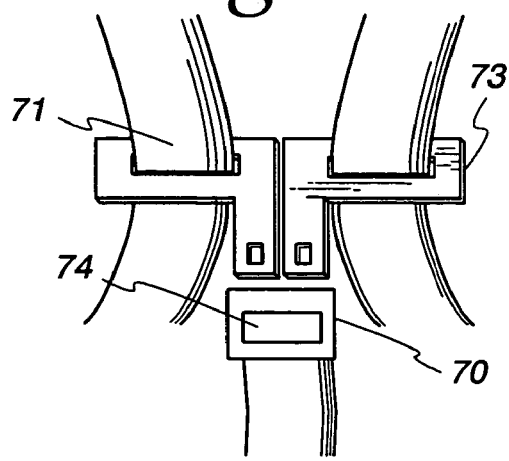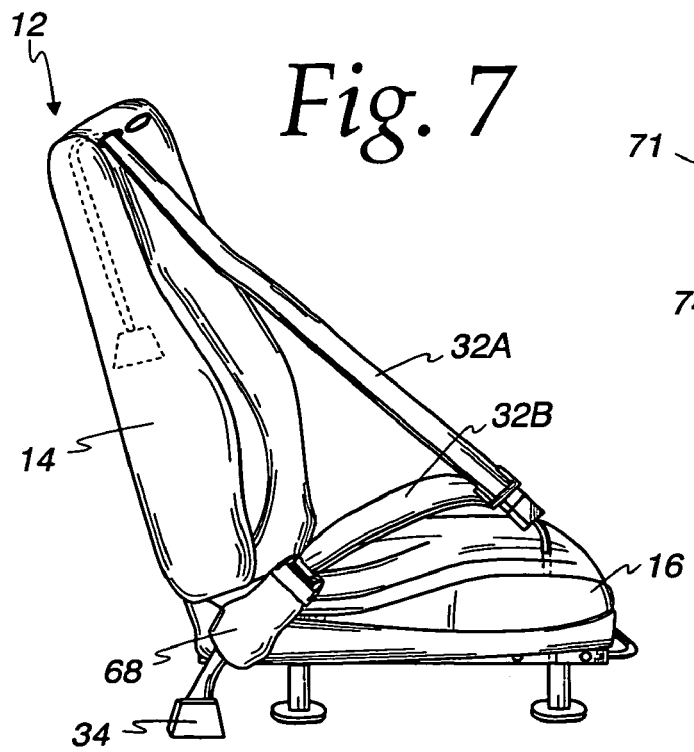

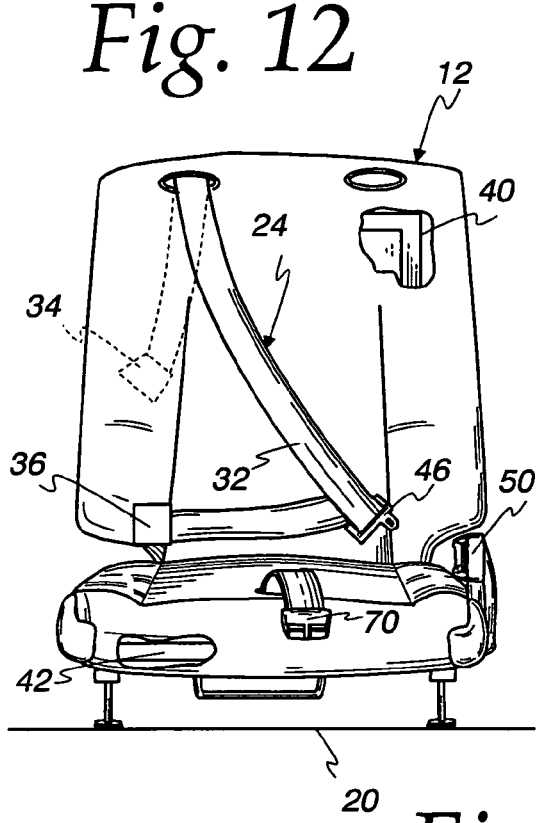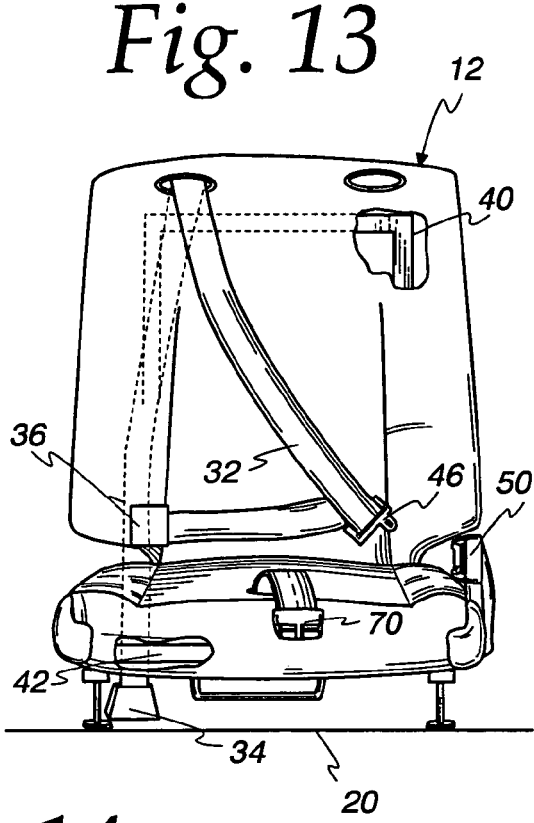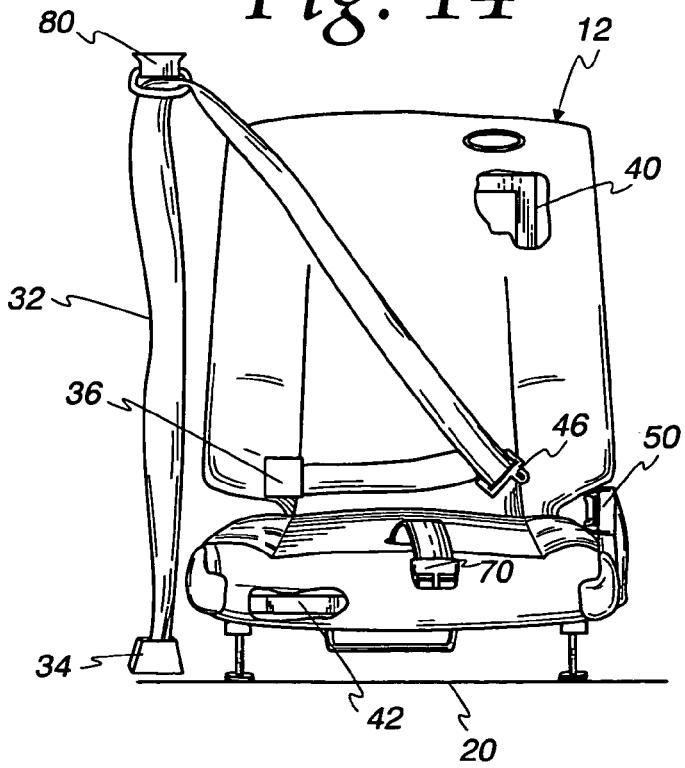

CONFIGURABLE VEHICLE RESTRAINT SYSTEM HAVING VARIABLE ANCHOR POINTS

BACKGROUND OF THE INVENTION

1. Field of the Invention

The present invention is directed to vehicle restraint systems and in particular those systems configurable to provide different modes of restraint.

2. Description of the Related Art

Various restraint systems are currently available for vehicle seats. The most common configuration is a three-point belt system consisting of a shoulder belt portion extending across the torso of the occupant and a lap belt portion extending across the waist of the occupant (see e.g., U.S. Pat. No. 3,847,434). Three anchor points are provided and include a buckle along one side of a vehicle seat, with a tongue plate slidingly mounted on the belt which is anchored to the floor and can run through a generally fixed guide loop or ring. A seat occupant pulls the tongue to extract belt webbing for connecting the tongue into the buckle with the belt running obliquely across the occupant's torso via a shoulder belt portion and across the occupant's waist via a lap belt portion. In addition, it is also known to have a seat belt system that provides the occupant the option of employing either a three-point or a four-point system (see e.g., U.S. Pat. No. 5,123,673). This is accomplished by providing a supplemental shoulder belt that extends across the torso of the occupant in a generally opposite manner to the shoulder belt portion previously described and attaches to a second buckle mechanism mounted on the opposite side of the seat with respect to the first buckle.

There are also child seat restraint systems that utilize a five-point configuration (see e.g., U.S. Pat. No. 5,908,223). This system employs a dual buckle at the fifth anchor point. This dual buckle is adapted to receive two latch plate tongues simultaneously. In this system, the occupant has only a single fixed belt restraint arrangement for their use. Accordingly, there are no systems that provide for full flexibility by providing occupants with more options in belt restraint arrangements beyond those for either the three or four point restraint system, such as the system shown in the '673 patent.

SUMMARY OF THE INVENTION

Accordingly, in one of several forms, the present invention provides for a vehicle restraint system that provides the occupant with the flexibility of selecting among a three-point, a four-point and a five-point belt system. Preferably, the restraint system is comprised of two mirror image three-point belt systems mounted on either side of the vehicle seat and a dual buckle mounted on the vehicle seat. The occupant can then employ each three-point system independently or can engage them concurrently to form the four-point system. A dual buckle is preferably provided to give the occupant the option of employing a five-point restraint system.

The vehicle restraint system provided by the present invention includes several anchor points located around the vehicle seat and seat belt webbing associated with the anchor points. In a preferred form, a first portion of belt webbing extends between a pair of anchor points located along one side of the seat and a second portion of belt webbing extends between another pair of anchor points on the other side of the seat. A first tongue is located along the first belt portion and is adapted to releasably engage with a first buckle mounted on the other side of the seat. A second tongue is located along the second belt portion and is adapted to releasably engage with a second buckle mounted on the one side of the seat. Each tongue also serves to divide the belt portion into a lap belt portion and a shoulder belt portion. In this arrangement, two generally symmetrical three-point belt systems can be employed either individually or simultaneously as discussed further hereinafter. This symmetrical arrangement avoids the need for special restraint hardware as the systems currently utilized for the driver and passenger seats, for instance, can be combined for one seat. Further, the symmetrical arrangement allows a user to select the three-point restraint option which is most comfortable to implement as they sit in the vehicle seat.

In another form, a connector or third buckle is mounted on the vehicle seat between the first and the second buckle. As previously mentioned, this third buckle is preferably a dual buckle mounted to the seat and adapted to receive the tongue associated with each of the three-point restraint systems. This provides the occupant with a five-point belt restraint option. When the first and the second tongue are engaged with the third buckle, the lap portions of the belt webbing extend across the thighs of the occupant.

As mentioned, an additional feature is that the first and second three-point restraint arrangements can be used simultaneously. In this instance, a four-point belt restraint option is provided. When the first and second three-point arrangements are used concurrently, overlapping lap belt portions are provided for the occupant. Thus, this arrangement provides the occupant with additional restraint and security in the vehicle seat.

BRIEF DESCRIPTION OF THE DRAWINGS

FIG. 1 is a front elevational view of a restraint system according to principles of the present invention showing two seat belt subsystems;

FIG. 2 is a side elevational view thereof;

FIGS. 3-6 are front elevation views showing the restraint system in various configuration modes;

FIG. 7 is a side elevational view of the restraint system shown in FIG. 6, without one of the seat belt subsystems for clarity;

FIG. 8 is a fragmentary perspective view of the dual buckle component;

FIGS. 12-16 are schematic diagrams showing various arrangements of seat belt restraint systems according to principles of the present invention.

DETAILED DESCRIPTION OF THE PREFERRED EMBODIMENTS

Figure 3:
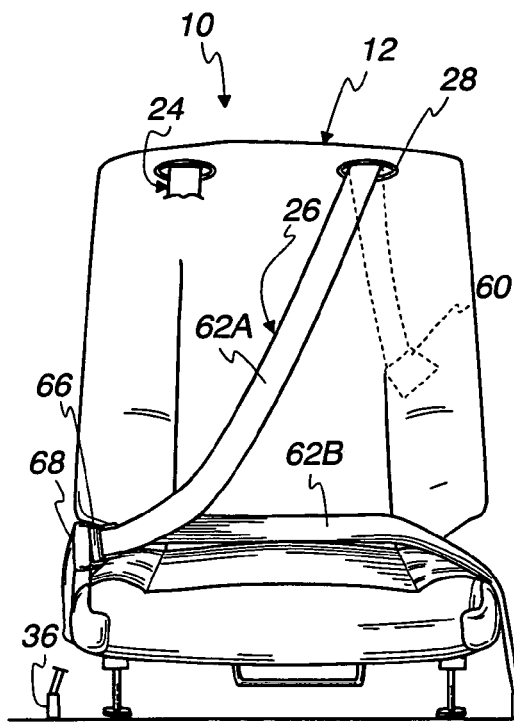

As will be seen herein, the present invention provides a vehicular restraint system which is configurable so as to wrap in different ways about the occupant's body, with anchor points either to the seat or to the vehicle body. The restraint system employs two seat belt sub-systems (which can comprise for example conventional three-point seat belt arrangements), with the seat belt sub-systems mounted on either side of a vehicle seat and, in the preferred illustrated form, a dual buckle located at the central portion of the vehicle seat cushion. The present invention can incorporate virtually any seat belt sub-system known today in which a single webbing is divided by a slidable releasable latch member into a shoulder belt portion and a lap/leg belt portion.

Turning now to the drawings and initially to FIGS. 1 and 2, a restraint system illustrating principles of the present invention is generally indicated at 10. Restraint system 10 is shown incorporated with a vehicle seat 12 of conventional construction including a seat back 14 and a seat bottom 16. Seat 12 is attached through mountings 18 to a vehicle floor 20 or other vehicle structural member. If desired, seat 12 could be mounted to floor 20 using a conventional slide rail system to provide front/back seat adjustment as is known in the art. Seat back 14 could be either fixedly attached to seat bottom 16 or could be made to pivot with respect thereto, as is known in the art. It should be understood that restraint system 10 could be employed in a wide variety of seating arrangements such as bench seats and in a wide variety of vehicles including automotive vehicles and construction equipment, for example. As such, it is contemplated that the seat 12 will be surrounded by open work such as a roll cage or by structural members such as door posts and roof members integrated with a surrounding vehicle enclosure.

Referring to FIGS. 1-4, the preferred and illustrated restraint system 10 includes multiple, (preferably two) seat belt subsystems generally indicated at 24 and 26 and a dual buckle or buckle mechanism 70 having provision for receiving a pair of latch members. Referring again to FIG. 1, seat belt sub-system 24 includes webbing member 32 supplied from the spool located within a conventional retractor 34, passing through a guide ring 22 located at the top of seat back 14, and having a free end coupled through an anchor plate 36 to the vehicle structure, preferably floor 20. Referring briefly to FIGS. 9-16, seat 12 includes conventional internal structural members such as seat back frame 40 and seat bottom frame 42. The retractor 34, retractor 60 and other anchor points (such as guide ring 80 shown in FIG. 14) discussed hereinafter can be mounted in any number of locations about the vehicle, such as in the trim, along the floor and to the seat. Where mounted in the seat back 14 as shown, the retractors will be provided with inertia locking devices that allow for different tilt positions of the seat back without significantly affecting emergency retractor locking provided by the inertia sensitive devices. Retractor 34 is omitted in FIGS. 9-11 for purposes of clarity. If desired, anchor plate 36 could be connected to a frame member of seat 12, preferably seat bottom frame 42.

Figure 4:
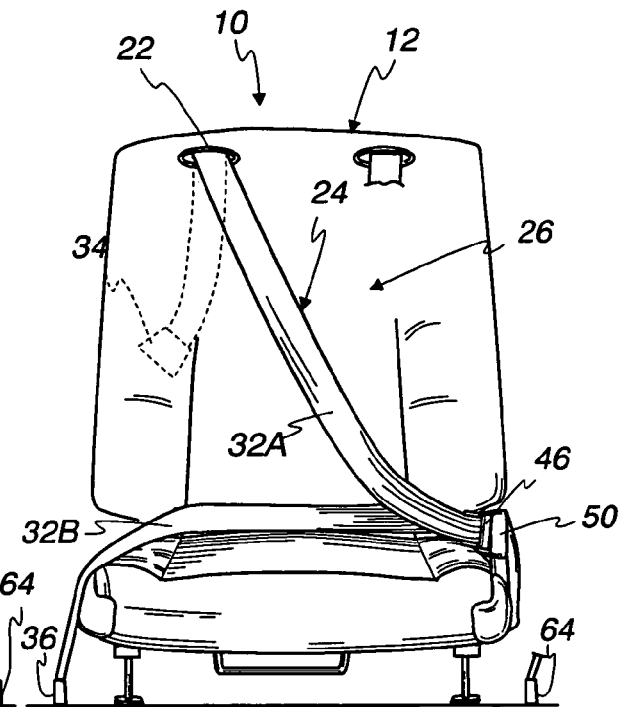

Referring again to FIG. 1, a tongue or latch plate 46 is slidingly engaged with webbing 32 so as to be freely positionable at any point along its length readily accessible to the seat occupant. Referring to FIG. 4, seat belt portions of sub-system 24 are shown, with most of the seat belt sub-system 26 being omitted for drawing clarity. Seat belt sub-system 24 further includes a buckle or buckle mechanism 50 for latchingly engaging a tongue portion of latch plate 46, as is known in the art. In the three-point belt restraint configuration or seat belt sub-system illustrated in FIG. 4, latch plate 46 divides belt 32 member into a shoulder belt portion 32A and a lap belt portion 32B when releasably latched to the buckle 50. If desired, buckle 50 could be secured to the vehicle frame work such as floor 20 or to the frame work of seat 12 as by connection to seat bottom frame 42 shown in FIG. 9.

Turning now to FIGS. 1 and 3, the second seat belt sub-system 26 preferably comprises a mirror image arrangement of the afore-described seat belt sub-system 24. Included in seat belt sub-system 26 is a retractor 60 having a spool (not shown) carrying a supply of webbing member 62 passing through guide ring 28 located at the top of seat back 14 and terminating in a free end connected to anchor plate 64 which is in turn connected to the vehicle structure, such as floor 20. Also included in seat belt sub-system 26 is a tongue or latch plate 66 which slides along webbing member 62. A buckle or buckle mechanism 68 is shown mounted to seat 12, and preferably the internal frame work portion thereof, such as seat bottom frame 42. In use, the tongue portion of sliding latch plate 66 is latchingly engaged with buckle 68 so as to divide webbing member 62 into a shoulder belt portion 62A and a lap belt portion 62B. As can be seen, the structure and function of seat belt sub-systems 24, 26 are substantially identical. If desired, as will be explained briefly herein, the seat belt sub-systems of the restraint system according to principles of the present invention can be of virtually any type known today and need not be similar to one another. However, from an inventory and cost standpoint, mirror image three-point system 24 and 26 are preferred as special hardware need not be provided significantly beyond that already in use in vehicles.

As has been explained thus far, restraint system 10 is configurable in a first three-point belt restraint configuration shown in FIG. 3 where seat belt sub-system 26 has a shoulder belt portion crossing the torso of the seat occupant in a first diagonal direction and crossing the seat occupant's lap in a first lateral direction. The free end of the seat belt webbing and the buckle 68 can be fixedly anchored or otherwise secured either to the vehicle structure such as floor 20 or to the seat frame. In the second three-point belt restraint configuration shown in FIG. 4, seat belt sub-system 24 is deployed in a manner similar to that explained above with respect to FIG. 3, but in an opposing mirror image configuration of seat belt sub-system 26. As such, the seat occupant can select whichever three-point arrangement 24 or 26 is most convenient. For instance, if the occupant is right-handed, the configuration provided by system 26 of FIG. 3 may be most convenient as the tongue plate 66 can be easily reached as it is located along belt webbing 62 extending along the left-hand side of the seat between an upper anchor point provided by belt guide 28 and lower anchor point provided by floor anchor 64. Likewise, if the occupant is left-handed, the configuration provided by system 24 of FIG. 4 may be most convenient as the tongue plate 46 can be easily reached as it is located along belt webbing 32 extending along the right-hand side of the seat between an upper anchor point provided by belt guide 22 and lower anchor point provided by floor anchor 36.

Figure 5:
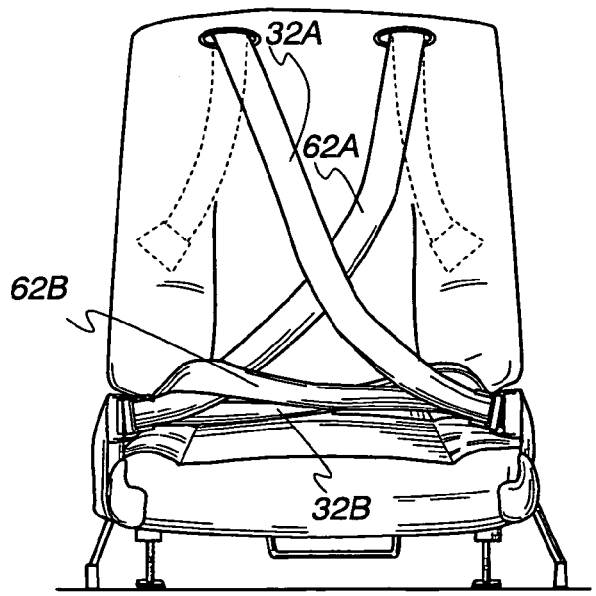

A third restraint configuration, providing a four-point belt restraint arrangement for system 10 is shown in FIG. 5 where both seat belt sub-systems 24, 26 are deployed at the same time. In this restraint configuration, a seat occupant is restrained by a criss-cross arrangement of shoulder belt portions 62A, 32A and overlapping or substantially coextensive seat belt portions 32B, 62B. In this manner, the occupant not only obtains additional restraint about their upper torso via the cris-crossed shoulder belt positions 32A and 62A, but also receives increased restraint along their lap via the overlapping lap belt portions 32B and 62B. In this instance, there are six anchor points that are operative, however since two are side-by-side on both sides of the seat, i.e., a buckle and floor anchor, this arrangement is considered the four-point restraint arrangement.

Figure 9:
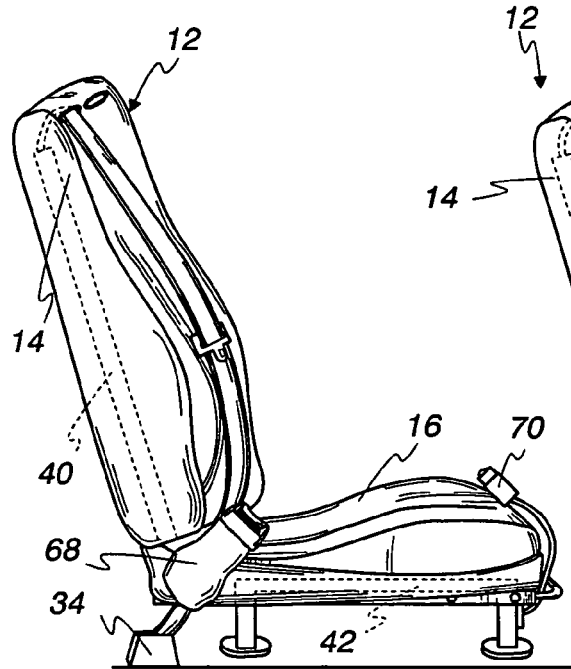
FIGS. 9-11 show various mounting arrangements for the dual buckle component.
Figure 10:
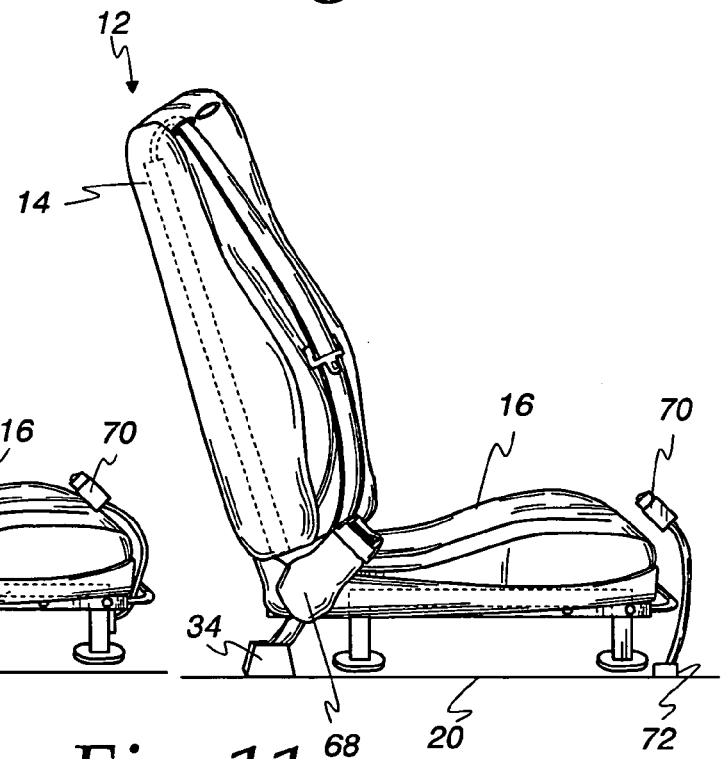
Figure 11:
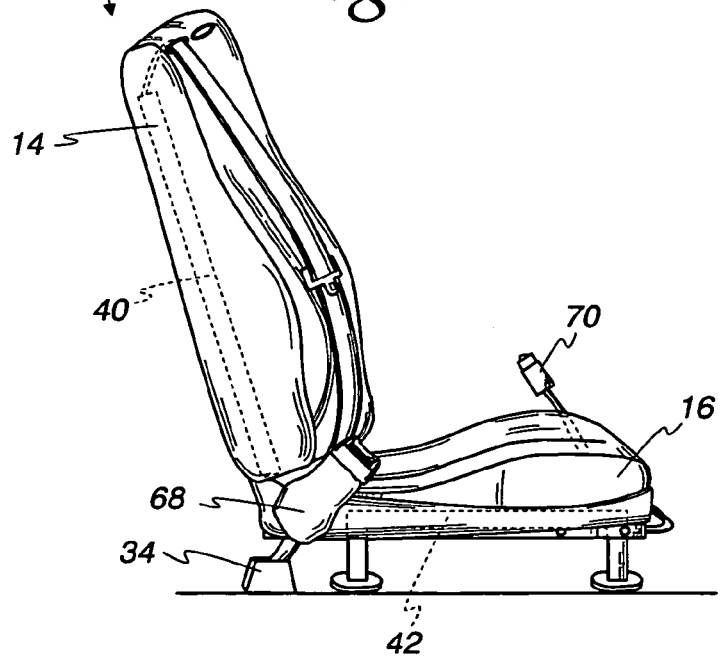
Figure 15:
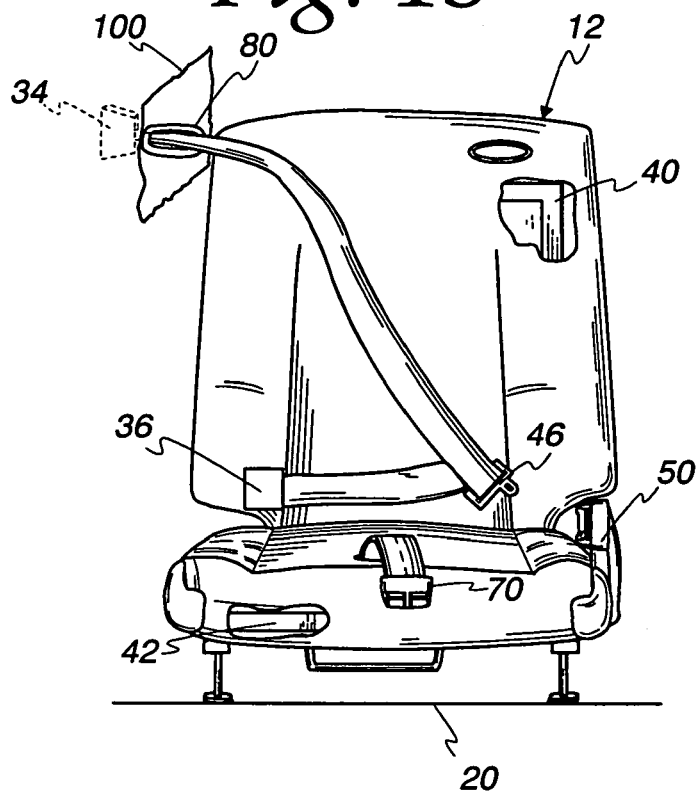

Turning now to FIGS. 1, 2, 6 and 8, a fourth restraint configuration is provided with use of a dual or two position buckle 70 preferably located along the center line of seat 12 and associated therewith. The two position buckle 70 is preferably attached to the frame work of seat 12, such as the seat bottom frame 42 shown in FIG. 9. If desired, buckle 70 can be secured the vehicle structure such as floor 20 utilizing an anchor plate 72 adjacent the front of the seat 12 to be associated therewith, as shown in FIG. 10. As mentioned, buckle 70 is preferably connected to the frame work of seat 12. As shown in the most preferred embodiments of FIGS. 1, 2 and 11, buckle 70 protrudes through the forward portion of seat bottom 16 although buckle 70 could be arranged outside of seat bottom 16 and still be coupled to the seat frame work, as shown in FIG. 9.

Referring to FIG. 8, buckle 70 is arranged to concurrently receive a pair of latch plates 46, 66. As indicated in FIGS. 6 and 8, the latch plates 46, 66 remain independent of one another and are latchingly engaged with buckle 70 in separate latching operations. To disengage either one or both of the latch plates 46, 66, the dual buckle 70 is provided with a single press-button actuator 74. Alternatively, if desired, buckle 70 can comprise a side-by-side pair of single buckles 50 or 68 each having their own actuator and could be connected to the seat frame work or vehicle structure utilizing separate connections.

However, it is preferred that the two latch plate receptacles 71, 73 of buckle 70 share a common housing and are connected either to the seat frame work or vehicle structure using a single connection such as a single webbing tether 76 shown in FIG. 8. In the five-point belt restraint configuration shown in FIG. 6, each leg of the seat occupant is restrained with a separate, independent seat belt portion 32b, 62b while the seat occupant's torso is restrained by shoulder belt portions 32a, 62a. Unlike the restraint configuration shown in FIG. 5 (frequently referred to as a "four-point restraint system") the shoulder belt portions 32a, 62a of FIG. 6 do not cross one another, and the belt members 32, 62 remain alongside one another at all times.

As can be seen from the above, restraint system 10 in its preferred form includes two retractors each with their own supply of webbing, two sliding latch plates, two single position buckles and one two position buckle. As explained above, the webbing free end, single position buckles and two position buckle can be anchored either to the seat frame work or the vehicle structure in virtually any number of combinations to provide the two opposite lower anchors on either side of the seat for each three-point belt arrangement or system 24 and 26. The upper anchor of each of the systems 24 and 26 are considered as being guide loops or rings 22, 28 generally provided adjacent their respective retractors. These guide loops 22 and 28 can be fixed about openings in the seat back 14 as shown, or can be mounted for pivoting such as with respect to guide loop or ring 80 shown in FIGS. 14 and 16 and described hereinafter. As mentioned above, it is not necessary that the seat belt sub-systems be arranged in mirror image form although this is generally preferred for ease of use by the seat occupant and because a relatively large portion of the seat remains clear, or free of obstructions, as shown in FIG. 1, so as to provide a visual orientation for the seat occupant when approaching the seat for entry.

Referring now to FIGS. 12-16 schematic diagrams are provided to indicate some of the various arrangements accommodated by the restraint system according to principles of the present invention. In the schematic diagrams of FIGS. 12-16 only one of the two seat belt sub-systems is shown for the purpose of drawing clarity. The other seat belt sub-system can comprise either a mirror image arrangement or any of the arrangements shown in FIGS. 12-16 or virtually any seat belt sub-system arrangement known today. Turning now to FIG. 12, the restraint arrangement is shown in diagrammatic form, corresponding to the arrangement of FIGS. 1-8. Retractor 34 is mounted to the frame work of seat 12 and webbing member 32 passes through the interior of the seat, emerging from an opening provided with a guide ring 22 toward the top of the seat back. The webbing then travels through sliding latch plate 46 and is terminated in an anchor plate 36. Anchor plate 36 may be secured to the seat frame work or to the vehicle structure such as floor 20. Latch plate 46 latchingly engages buckle 50 which can be mounted either to the seat frame work or the vehicle structure, such as floor 20. The two position buckle 70 may also be mounted either to the seat frame work or to floor 20 or other portion of the vehicle structure. As mentioned, the remaining seat belt sub-system may comprise a mirror image of seat belt sub-system 24 as shown or it may comprise virtually any other three-point conventional seat belt sub-system arrangement.

Figure 16:
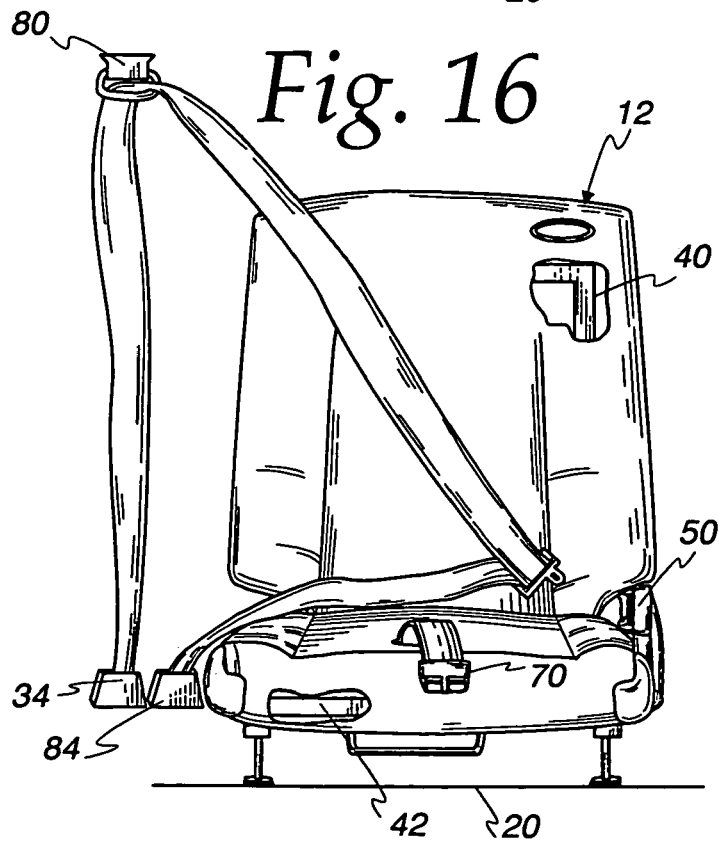

Referring now to FIG. 13, the restraint system shown is identical to that of FIG. 12, except that the retractor 34 is mounted to the floor 20, with the webbing traveling upwardly either inside or outside of the seat back and emerging through the upper portion of the seat back. The restraint system shown in FIG. 14 is similar to that of FIG. 13 except that the webbing member 32 travels through a guide ring 80 mounted to a door frame or other portion of the vehicle structure such as the B or C pillar member therein, either fixed thereto or mounted via a height adjusting device that is fixed to the vehicle structure to allow the occupant to change orientation of the shoulder belt portion as extending across their torso to best suit their size. In addition to or instead of vertical adjustments, horizontal adjustments can also be provided by appropriate devices connected to the ring 80, as are known. In the restraint system shown in FIG. 14 webbing member 32 crosses the outer surface of the seat back. When deployed, the webbing member 32 of the restraint system shown in FIG. 14 crosses the seat back in a generally diagonal direction. In the restraint system shown in FIG. 15, retractor 34 is mounted within the vehicle trim 100 such as to an internal surface of a door post or other structural member of the vehicle. A guide ring 80 is secured about an opening in the trim 100 from which the belt webbing emerges extending down to its free end at lower anchor 36. The restraint system shown in FIG. 16 is generally similar to that shown in FIG. 14 except that the anchor plate of FIG. 36 is replaced with a second retractor 84.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A restraint system for a vehicle seat that provides a seat occupant options for multiple seat belt arrangements, the restraint system comprising:
   a plurality of anchor points at predetermined locations about the vehicle seat for seat belt webbing;
   one of a three-point belt restraint arrangement and a four-point belt restraint arrangement, the three-point belt restraint arrangement formed by the seat belt webbing divided by a tongue on the seat belt webbing into a shoulder belt portion and a lap belt portion that both extend from one side of the seat to the other side of the seat with the divided seat belt webbing including the shoulder belt and lap belt portions extending between three of the anchor points and the four-point belt restraint arrangement formed by the seat belt webbing including the shoulder and lap belt portions with the seat belt webbing extending between four of the anchor points; and a five-point belt restraint arrangement for the occupant formed by the seat belt webbing extending between five of the anchor points.

2. The restraint system of claim 1 wherein the anchor points and the seat belt webbing extending therebetween allow for both the three-point belt restraint arrangement and the four-point belt restraint arrangement to be selected by the seat occupant.

3. The restraint system of claim wherein the seat has opposed lateral sides, the plurality of anchor points comprise a pair of anchor points along each side of the seat, and the seat belt webbing includes a first belt member extending between one of the pairs of anchor points along one side of the vehicle seat and a second belt member extending between the other of the pairs of anchor points along the other side of the vehicle seat.

4. The restraint system of claim 1 wherein the one of the three-point and four-point belt restraint arrangements comprises the three-point belt restraint arrangement including the seat belt webbing extending between three of the anchor points and further including a second three-point belt restraint arrangement having anchor points generally on the opposite side of the vehicle seat from the anchor points of the first three-point belt restraint arrangement.

5. The restraint system of claim 4 wherein the first and second three-point belt restraint arrangements are symmetrical.

6. A restraint system for a vehicle seat that provides a seat occupant options for multiple seat belt arrangements, the restraint system comprising:

a plurality of anchor points at predetermined locations about the vehicle seat for seat belt webbing;

one of a three-point belt restraint arrangement and a four-point belt restraint arrangement, the three-point belt restraint arrangement formed by the seat belt webbing extending between three of the anchor points and the four-point belt restraint arrangement formed by the seat belt webbing extending between four of the anchor points; and a five-point belt restraint arrangement for the occupant formed by the seat belt webbing extending between five of the anchor points, wherein the plurality of anchor points include a buckle and a lower fixed anchor member on both sides of the seat to allow for either one of the three-point belt restraint and the four-point belt restraint arrangement to be selected by the seat occupant.

7. The restraint system of claim 6 further comprising a dual buckle located generally between said buckles for releasably latching with latching members to provide the five-point belt restraint arrangement, with the latching members dividing said first and said second belt members into shoulder portions and leg portions, for restraining the seat occupant's torso and legs respectively.

8. The restraint system of claim 7 wherein the leg portion of the first belt member and the leg portion of the second belt member independently restrain each leg of the seat occupant when the first tongue and the second tongue are engaged with the dual buckle.

9. A restraint system for a vehicle seat that provides a seat occupant options for multiple seat belt arrangements, the restraint system comprising:

a plurality of anchor points at predetermined locations about the vehicle seat for seat belt webbing, including at least one anchor point located off the vehicle seat;

one of a three-point belt restraint arrangement and a four-point belt restraint arrangement, the three-point belt restraint arrangement formed by the seat belt webbing extending between three of the anchor points and the four-point belt restraint arrangement formed by the seat belt webbing extending between four of the anchor points; and a five-point belt restraint arrangement for the occupant formed by the seat belt webbing extending between five of the anchor points, including the at least one anchor point located off the vehicle seat, wherein the five-point belt restraint arrangement is comprised of a first portion of the seat belt webbing extending between two anchor points along one side of the vehicle seat, a second portion of the seat belt webbing extending between another two anchor points along the other side of the vehicle seat, a first tongue on the first belt webbing, a second tongue on the second belt webbing and a buckle generally mounted to or adjacent the vehicle seat adapted to receive both the first and the second tongue.

10. A restraint system for a vehicle seat that provides a seat occupant options for multiple seat belt arrangements, the restraint system comprising:

a plurality of anchor points at predetermined locations about the vehicle seat for seat belt webbing;

a first three-point belt restraint arrangement and a four-point belt restraint arrangement, the three-point belt restraint arrangement formed by the seat belt webbing extending between three of the anchor points and the four-point belt restraint arrangement formed by the seat belt webbing extending between four of the anchor points;

a five-point belt restraint arrangement for the occupant formed by the seat belt webbing extending between five of the anchor points; and a second three-point belt restraint arrangement having anchor points generally on the opposite side of the vehicle seat from the anchor points of the first three-point belt restraint arrangement, wherein the three-point belt arrangements each include a latch plate and a corresponding buckle generally on opposite sides of the seat prior to deployment, and a floor anchor on opposite sides of the seat adjacent each of the buckles.

11. A restraint system for a vehicle seat that provides a seat occupant options for multiple seat belt arrangements, the restraint system comprising:

a plurality of anchor points at predetermined locations about the vehicle seat for seat belt webbing;

a first three-point belt restraint arrangement and a four-point belt restraint arrangement, the three-point belt restraint arrangement formed by the seat belt webbing extending between three of the anchor points and the four-point belt restraint arrangement formed by the seat belt webbing extending between four of the anchor points;

a five-point belt restraint arrangement for the occupant formed by the seat belt webbing extending between five of the anchor points; and a second three-point belt restraint arrangement having anchor points generally on the opposite side of the vehicle seat from the anchor points of the first three-point belt restraint arrangement, wherein each three-point belt arrangement includes belt webbing generally divided into shoulder and lap belt portions when deployed with the lap belt portions generally overlapping with each three-point belt arrangement deployed.

12. A restraint system for a vehicle seat that provides a seat occupant options for multiple seat belt arrangements, the restraint system comprising:

a plurality of anchor points at predetermined locations about the vehicle seat for seat belt webbing;

a three-point belt restraint arrangement formed by the seat belt webbing extending between three of the anchor points; and a five-point belt restraint arrangement for the occupant formed by the seat belt webbing extending between five of the anchor points, wherein the seat belt webbing extending between three of the anchor points forms a second three-point belt restraint arrangement having anchor points on the opposite side of the vehicle seat from the anchor points of the first three-point belt restraint arrangement, each three point belt restraint arrangement including a retractor for carrying a supply of the webbing, a tongue slidably carried on the webbing, and a buckle.

13. A restraint system for a vehicle seat that provides a seat occupant options for multiple seat belt configurations, the restraint system comprising:

a plurality of anchor points at predetermined locations about the vehicle seat for seat belt webbing;

a first three-point belt restraint arrangement for the seat occupant formed by the seat belt webbing extending between three of the anchor points;

a second three-point belt restraint arrangement for the seat occupant formed by the seat belt webbing extending between three of the anchor points and substantially symmetrically arranged relative to the first three-point belt restraint arrangement;

a connector configured to allow the seat occupant to select a five-point belt restraint arrangement; and a buckle and a tongue on the seat belt webbing with the buckle positioned on one side of the seat to permit the occupant seated on the vehicle seat to releasable insert and latch the tongue into the buckle to form one of the plurality of anchor points, the buckle including an actuator that is operated by the seated occupant to release the latched tongue from the buckle.

14. The restraint system of claim 13 wherein the buckle and the tongue are associated with the first three-point belt restraint arrangement, and the second three-point belt restraint arrangement also includes a tongue, and the connector includes a dual buckle associated with the vehicle seat configured to receive each of the tongues in the five-point belt arrangement.

15. The restraint system of claim 13 wherein the vehicle seat includes a seat framework and the vehicle seat is mounted within a vehicle having a vehicle structure and the anchor points are mounted to one of said seat framework and said vehicle structure.

16. A restraint system for a vehicle seat that provides a seat occupant options for multiple seat belt configurations, the restraint system comprising:

a plurality of anchor points at predetermined locations about the vehicle seat for seat belt webbing;

a first three-point belt restraint arrangement for the seat occupant formed by the seat belt webbing extending between three of the anchor points;

a second three-point belt restraint arrangement for the seat occupant formed by the seat belt webbing extending between three of the anchor points and substantially symmetrically arranged relative to the first three-point belt restraint arrangement; and a connector configured to allow the seat occupant to select a five-point belt arrangement, wherein the anchor points of the first and second three-point belt restraint arrangements each include a buckle and a fixed anchor on either side of the seat.

17. The restraint system of claim 16 wherein:

the first and second three point belt restraint arrangements are each comprised of a portion of the seat belt webbing extending between upper and lower respective anchor points generally adjacent the vehicle seat, a tongue along each of the belt webbing portions for dividing the seat belt webbing portions into shoulder belt and lap belt portions with the tongue secured to the buckle; and the connector includes a two-position buckle generally mounted to or adjacent the vehicle seat configured to receive each of the tongues in the five-point belt arrangement.

18. A restraint system for a vehicle seat that provides a seat occupant options for multiple seat belt configurations, the restraint system comprising:

a plurality of anchor points at predetermined locations about the vehicle seat for seat belt webbing;

a first three-point belt restraint arrangement for the seat occupant formed by the seat belt webbing extending between three of the anchor points;

a second three-point belt restraint arrangement for the seat occupant formed by the seat belt webbing extending between three of the anchor points and substantially symmetrically arranged relative to the first three-point belt restraint arrangement; and a connector configured to allow the seat occupant to select a five-point belt arrangement, wherein the first and second three point belt restraint arrangements are comprised of corresponding first and second seat belt webbing members extending between upper and lower respective anchor points on either side of the seat, a buckle mechanism generally adjacent either side of the seat, and a tongue along each of the belt webbing members for dividing the members into shoulder and lap belt portions with the tongues secured to the corresponding buckle mechanisms.

19. The restraint system of claim 18 wherein the tongues are slidable along said first and said second belt members.

20. A restraint system for a vehicle seat that provides a seat occupant options for multiple seat belt configurations, the restraint system comprising:

a plurality of anchor points at predetermined locations about the vehicle seat for seat belt webbing;

a first three-point belt restraint arrangement for the seat occupant formed by the seat belt webbing extending between three of the anchor points;

a second three-point belt restraint arrangement for the seat occupant formed by the seat belt webbing extending between three of the anchor points and substantially symmetrically arranged relative to the first restraint arrangement; and a tongue and a buckle associated with each of the first and second three-point belt arrangements so that with each tongue secured in its respective buckle the lap belt portions of the first and second three-point belt restraint arrangements overlap to secure the lap of the seat occupant.

21. The restraint system of claim 20 wherein the tongue associated with the first three-point belt arrangement is located along a first portion of the belt webbing extending between two of the anchor points and the tongue associated with the second three-point belt arrangement is located along a second portion of the belt webbing extending between another two of the anchor points.

22. The restraint system of claim 21 wherein the two anchor points for each of the three-point belt arrangements includes an upper guide anchor and a lower floor anchor for the first and second belt portions.

23. The restraint system of claim 20 wherein the anchor points for each of the three-point belt arrangements includes a pair of floor mounted anchors on each side of the seat.

24. The restraint system of claim 23 wherein one of the pair of floor mounted anchors is a buckle and the other is webbing anchor member.

25. The restraint system of claim 20 further comprising:
a dual buckle generally mounted to or adjacent the vehicle seat configured to receive each of the tongues of the first and second three-point belt arrangements; and
a five-point belt restraint arrangement for the seat occupant formed by the seat belt webbing extending between the anchor points and the dual buckle.

26. A restraint system for a vehicle seat that provides a seat occupant options for multiple seat belt configurations including three-point, four-point and five-point restraint configurations, the restraint system comprising:
a seat having a back rest and a seat rest extending between a first side and a second side of the seat;
seat belt webbing associated with the seat;
a first set of anchor points generally adjacent the first side of the seat having a first portion of the belt webbing extending therebetween;
a second set of anchor points generally adjacent the second side of the seats having a second portion of the belt webbing extending therebetween;
a first tongue located along the first belt portion;
a second tongue located along the second belt portion;
a first buckle mechanism generally adjacent the first side of the seat adapted to receive the second tongue;
a second buckle mechanism generally adjacent the second side of the seat adapted to receive the first tongue; and
a third buckle mechanism generally mounted to or adjacent the seat rest, adapted to receive both the first tongue and the second tongue.

27. The restraint system of claim 26 wherein the third buckle mechanism has a buckle housing including tongue receptacles with one receptacle adapted to receive the first tongue and another receptacle adapted to receive the second tongue.

28. The restraint system of claim 26 wherein the third buckle mechanism is generally mounted to or adjacent the seat rest in a location generally between the first and second buckle mechanisms.

29. The restraint system of claim 28 wherein the vehicle seat includes a seat framework and the vehicle seat is mounted within a vehicle having a vehicle structure and the anchor points are mounted to one or both of said seat framework and said vehicle structure.

30. The restraint system of claim 26 wherein the first and second tongues are slidable along said first and said second belt portions.

31. A restraint system for a vehicle seat, having multiple seat belt components and which permits the seat occupant to configure the seat belt components in a number of different restraint configurations, the restraint system comprising:
a pair of seat belt sub-systems associated with the vehicle seat, each seat belt sub-system comprising a retractor containing a supply of seat belt webbing having a free end, a fixed anchor point secured to the seat belt webbing free end, a tongue slidable along the seat belt webbing and a tongue-engaging buckle;
a dual buckle located generally between the buckles of the seat belt sub-systems and engageable with the tongues of the seat belt sub-systems; and
said restraint system configurable in four restraint configurations, including a first restraint configuration in which the seat belt webbing of one of the seat belt sub-systems is latched so as to cross the occupant's torso in the first direction and so as to cross the occupant's lap, a second restraint configuration in which the seat belt webbing of the other seat belt system is latched so as to cross the occupant's torso in a second direction and so as to cross the occupant's lap, a third restraint configuration in which the seat belt webbing of the seat belt sub-systems criss-crosses the occupant's torso and crosses the occupant's lap and a fourth restraint configuration in which the seat belt webbing of the seat belt sub-systems crosses the occupant's torso in a generally V-shaped pattern, crosses the occupant's legs and is coupled to the dual buckle at a point generally between the occupant's legs.

32. The restraint system of claim 31 wherein the vehicle seat has opposed lateral sides, and the buckle of one seat belt sub-system is located on one side of the vehicle seat and engages the tongue of the other seat belt sub-system located on the other side of the vehicle seat, and the buckle of the other seat belt sub-system is located on the other side of the vehicle seat and engages the tongue of the other seat beat sub-system located on the one side of the vehicle seat.

33. The restraint system of claim 32 wherein the vehicle seat includes a seat framework and the vehicle seat is mounted within a vehicle having a vehicle structure and the retractors, the anchor points at the webbing free ends, and the buckles of the seat belt sub-systems are mounted to one or both of said seat framework and said vehicle structure.

34. The restraint system of claim 32 wherein the retractors of the seat belt sub-systems are mounted in the vehicle seat.

* * * * *

UNITED STATES PATENT AND TRADEMARK OFFICE
CERTIFICATE OF CORRECTION

| | |
|---|---|
| PATENT NO. | : 7,364,199 B2 |
| APPLICATION NO. | : 10/728670 |
| DATED | : April 29, 2008 |
| INVENTOR(S) | : Daniel Alejandro Romero Elizondo et al. |

It is certified that error appears in the above-identified patent and that said Letters Patent is hereby corrected as shown below:

Column 7, line 16, delete "claim" and insert --claim 1-- therefor.
Column 11, line 40, delete "seats" and insert --seat-- therefor.
Column 12, line 48, delete "beat" and insert --belt-- therefor.

Signed and Sealed this

Second Day of September, 2008

JON W. DUDAS
*Director of the United States Patent and Trademark Office*